(12) United States Patent
Seo et al.

(10) Patent No.: US 7,354,607 B2
(45) Date of Patent: Apr. 8, 2008

(54) DRINK CONTAINING ULTRAFINE POWDER OF GINSENG AND THE METHOD THEREOF

(75) Inventors: Yong-Ki Seo, Seoul (KR); Geun Lee, Seoul (KR); Kang-Pyo Lee, Seoul (KR); Hyun-Soon Sung, Seoul (KR)

(73) Assignee: CJ Cheiljedang Corp., Seoul (KR)

( * ) Notice: Subject to any disclaimer, the term of this patent is extended or adjusted under 35 U.S.C. 154(b) by 34 days.

(21) Appl. No.: 11/034,254

(22) Filed: Jan. 13, 2005

(65) Prior Publication Data

US 2005/0170021 A1    Aug. 4, 2005

(30) Foreign Application Priority Data

Jan. 20, 2004    (KR) ..................... 10-2004-0004317

(51) Int. Cl.
*A61K 36/254* (2006.01)
(52) U.S. Cl. .................................... 424/728
(58) Field of Classification Search ...................... None
See application file for complete search history.

(56) References Cited

U.S. PATENT DOCUMENTS

| | | | | |
|---|---|---|---|---|
| 4,981,699 A | * | 1/1991 | Inada et al. .................... | 426/7 |
| 5,096,617 A | * | 3/1992 | Ball et al. .................... | 516/116 |
| 5,290,557 A | * | 3/1994 | Mason et al. ................ | 424/410 |
| 5,858,992 A | * | 1/1999 | Nishimoto et al. ........... | 514/54 |
| 6,004,609 A | * | 12/1999 | Lee ............................ | 426/590 |
| 6,005,100 A | * | 12/1999 | Mandai et al. .......... | 536/123.13 |
| 6,096,364 A | * | 8/2000 | Bok et al. .................... | 426/590 |
| 6,210,738 B1 | * | 4/2001 | Chen .......................... | 426/597 |
| 6,416,795 B1 | * | 7/2002 | Choi et al. .................. | 424/725 |
| 6,586,017 B2 | * | 7/2003 | Sha et al. .................... | 424/728 |
| 7,067,150 B2 | * | 6/2006 | Farber et al. ................ | 424/488 |
| 2003/0031732 A1 | * | 2/2003 | Kim et al. .................. | 424/728 |
| 2004/0161524 A1 | * | 8/2004 | Sakai et al. ................. | 426/655 |

FOREIGN PATENT DOCUMENTS

WO    WO 03/000074 A 1    * 1/2003

* cited by examiner

*Primary Examiner*—Susan Doe Hoffman
*Assistant Examiner*—Catheryne Chen
(74) *Attorney, Agent, or Firm*—The Nath Law Group; Susanne M. Hopkins; Ari G. Zyteer

(57) ABSTRACT

The present invention relates to a method of preparation of a drink composition containing powder of ginseng or red ginseng, and more particularly, it relates to a health drink containing powder of ginseng or red ginseng ultrafinely pulverized by a suitable pulverizer and its preparation. Therefore, it is possible to utilize all ingredients of ginseng or red ginseng contained in the drink, but a conventional ginseng drink contains extract of ginseng or red ginseng.

2 Claims, 4 Drawing Sheets

DRINK CONTAINING ULTRAFINE POWDER OF GINSENG AND THE METHOD THEREOF

FIELD OF THE INVENTION

The present invention relates to a method of preparation of a drink composition containing powder of ginseng or red ginseng, and more particularly, it relates to a health drink containing powder of ginseng or red ginseng ultrafinely pulverized by a suitable pulverizer and its preparation. Therefore, it is possible to utilize all ingredients of ginseng or red ginseng contained in the drink, but a conventional ginseng drink contains extract of ginseng or red ginseng.

PRIOR ART

As method for the preparation of a drink made from ginseng or steamed red ginseng, recently disclosed is Korean patent application publication No. 2003-0037379 (publication date: May 14, 2003, "A drink containing the red ginseng, and a method for preparing thereof"), wherein a concentrated extract obtained by extracting ginseng or red ginseng with water or ethyl alcohol is utilized as a major raw material and various kinds of herb medicine and food materials are admixed thereto.

However, the yield of extraction of ginseng with water or ethyl alcohol is from 40 to 60%, which means that any specific components corresponding to only 40 to 60% of total ginseng or red ginseng can be utilized. Further, large amount of saponin components is not extracted and still remains out of the extract. Therefore, about half of components in ginseng (such as acidic polysaccharides, amino acids, fatty acids, free sugars, etc.) may be wasted.

In addition, there are many companies who makes powder of ginseng or red ginseng in Korea, but almost of them produce a crude powder with a mean particle size of about 150 μm by using a roll crusher, a cutter mill, a pin mill or the like. As a result, almost of the crude powder thus produced are utilized only as itself or as a raw materials for ginseng confectionery, as can be seen in Korean Patent Application Publication No. 2002-0048853 (Publication date: Jun. 24, 2002, "Ginseng chocolate and composition and method for manufacturing the same"), to produce a low value added and to provide very limited opportunities for the development and advanced research of new products.

Thereby, the present inventors has made an extensive study in order to widen the application field of ginseng or red ginseng powder and to provide a method for the preparation of a drink composition comprising mixing ultrafine powder of ginseng or red ginseng prepared by micro pulverization process, a mixture stabilizer and emulsifier and then homogenizing them to give a ginseng or red ginseng drink having a sufficient stability, and a ginseng or red ginseng drink thus prepared.

In order to solve the above technical problems of prior art, the purpose of the present invention is to provide a drink composition which makes possible to anticipate an increase of bioavailability rate due to the increase of unit surface area by powdering ultrafine particles, which enables to ingest 100% of ginseng or red ginseng by using ginseng or red ginseng powder as it is, and as well as which has a good stability against layer separation, and a method for the preparation thereof.

SUMMARY OF THE INVENTION

The present invention relates to a method of preparation of a drink composition containing powder of ginseng or red ginseng, and more particularly, it relates to a health drink containing powder of ginseng or red ginseng ultrafinely pulverized by a suitable pulverizer and its preparation. Therefore, it is possible to utilize all ingredients of ginseng or red ginseng contained in the drink, but a conventional ginseng drink contains extract of ginseng or red ginseng.

The present invention provides a health drink prepared by mixing 0.05~5.0% (w/v) of ginseng or red ginseng powder, 0.05~5% (w/v) of honey, 0.05~5% (w/v) of herb medicine extract, 0.01~10.0% (w/v) of a sweetener, 0.5~5.0% (w/v) of a vegetable cream, 0.01~1.0% (w/v) of a mixture stabilizer, 0.01~0.3% (w/v) of an emulsifier, 0.001~0.01% (w/v) of a defoamer, 0.01~0.5% (w/v) of a flavor, 0.01~0.06% (w/v) of a preservative and 69~99% (w/v) of purified water, homogenizing the resulted mixture under a pressure of 50~500 kgf/cm$^2$ and sterilizing the resulted mixture at a temperature of 80~150° C. for 0.1~20 mm, wherein said ginseng or red ginseng powder is prepared via 2~10 steps including a micro pulverization process to give a ultrafine powder with a mean particle size of 0.1~74 μm.

BRIEF DESCRIPTION OF THE DRAWINGS

Other objects and aspects of the present invention will become apparent from the following description of embodiments with reference to the accompanying drawing in which.

DETAILED DESCRIPTION OF THE PREFERRED EMBODIMENT

Figure 1:
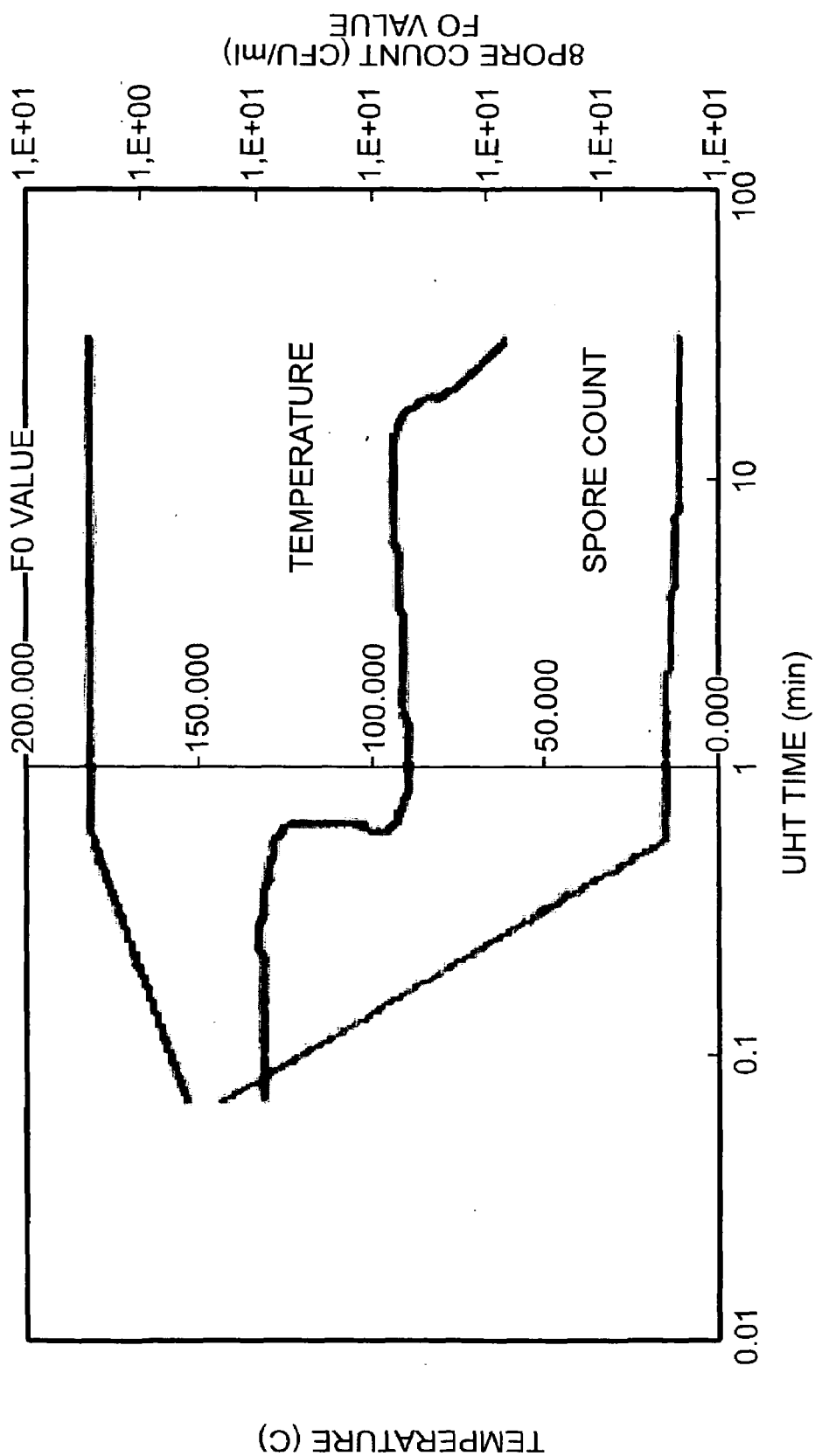
FIG. 1 shows the result of sterility to *Bacillus subtilis* spore by the composition of the present invention.

The present invention relates to a method of preparation of a drink composition containing powder of ginseng or red ginseng, and more particularly, it relates to a health drink containing powder of ginseng or red ginseng ultrafinely pulverized by a suitable pulverizer and its preparation. Therefore, it is possible to utilize all ingredients of ginseng or red ginseng contained in the drink, but a conventional ginseng drink contains extract of ginseng or red ginseng.

The present invention provides a health drink prepared by mixing 0.05~5.0% (w/v) of ginseng or red ginseng powder, 0.05~5% (w/v) of honey, 0.05~5% (w/v) of herb medicine extract, 0.01~10.0% (w/v) of a sweetener, 0.5~5.0% (w/v) of a vegetable cream, 0.01~1.0% (w/v) of a mixture stabilizer, 0.01~0.3% (w/v) of an emulsifier, 0.001~0.01% (w/v) of a defoamer, 0.01~0.5% (w/v) of a flavor, 0.01~0.06% (w/v) of a preservative and 69~99% (w/v) of purified water, homogenizing the resulted mixture under a pressure of 50~500 kgf/cm$^2$ and sterilizing the resulted mixture at a temperature of 80~150° C. for 0.1~20 min, wherein said ginseng or red ginseng powder is prepared via 2~10 steps including a micro pulverization process to give an ultrafine powder with a mean particle size of 0.1~74 μm.

Ginseng or red ginseng powder used in the present invention is prepared from 4 or more-year-old ginseng or red ginseng by a micro pulverization process via 2~10 steps using a pulverizer such as a cross beater mill, a vibration ball mill, an attrition mill or a Jet mill to give an ultrafine powder with a suitable mean particle size of 0.1~74 5um. When it is contained in an amount of more than 5% (w/v), it is difficult to utilize it as a drink due to its physical properties. When it is contained in an amount of less than 0.05% (w/v), it is difficult to feel the flavor of ginseng or red ginseng.

In the context of the present invention, ginseng includes all varieties and types of ginseng such as a white ginseng, a fresh ginseng, a red ginseng, a Taeguk ginseng, a black ginseng, dextrinized ginseng (puffing ginseng), an enzyme-treated ginseng, a fermented ginseng as well as all processed ginsengs from a fresh ginseng or a tissue culture ginseng.

In the context of the present invention, a vegetable cream is a product according to the standard of Food Code and contains vegetable oils (refined oils) as its major component, to which sugars are added and then processed into a powdery phase with a water content of less than 8%. A vegetable cream is used to reduce a bitter taster of ginseng and give a savory and soft taste. When it is contained in an amount of less than 0.5% (w/v), it shows a tendency to decrease the bitterness reduction effect. When it is contained in an amount of more than 5% (w/v), there is a problem that the flavor of ginseng is decreased.

The mixture stabilizer "Homogen CJ-1" is composed of 1~20% (w/w) of carageenan, 0.5~20% (w/w) of CMC-Na, 5~60% (w/w) of microcrystalline cellulose, 0.5~10% (w/w) of xanthan gum, 2~30% (w/w) of sugar ester of fatty acids, 0.5~30% (w/w) of dextrin, 0.5~10% (w/w) of excipient, 0.05~0.5% (w/w) of an edible oil. When it is contained in an amount of less than 0.01% (w/v), the stability of the composition is decreased. When it is contained in an amount of more than 1.0% (w/v), the viscosity of the composition is increased and it is difficult to drink it.

In the present invention, 2~6 kinds of emulsifier with HLB value of 3.0~20.0 are employed. When it is contained in an amount of less than 0.01% (w/v), the emulsifying ability is decreased to generate a cream layer. When it is contained in an amount of more than 0.3% (w/v), there is a problem that off-taste is generated.

Since the composition prepared according to the ratio of raw materials has a neutral range pH of 5.5~6.5, it is necessary to secure the microbial safety. Therefore, a sterility to Bacillus subtilis spore as an indicator microbe is expected and the result is shown in FIG. 1. A lethality of $2.4 \times 10^{-5}$ (sterility 99.998%) shown in FIG. 1 means that almost all the microbe are extinguished when initial microbial count is less than $10^3$. Therefore, it is possible to secure the microbial safety by controlling microbial count in raw materials to the level of less than 100 cfu/g.

EXAMPLE 1

TABLE 1

| Sample | Ginseng powder | HFCS | Oligotose | SWA-10D | Xanthan gum | Purified water | Total amount |
|---|---|---|---|---|---|---|---|
| A | 3 | 3 | 19.2 | 1.25 | 0.5 | Proper quantity | 100 |
| B | 3 | 3 | 19.2 | 1.25 | 0.05 | Proper quantity | 100 |
| C | 3 | 6 | — | 1.25 | 0.05 | Proper quantity | 100 |
| D | 3 | 6 | — | 1.25 | — | Proper quantity | 100 |

In purified water were added and sufficiently dissolved oligotose, SWA-10D (emulsifier, polyglycerol ester) and xanthan gum according to the composition of Table 1, and then was added and fully dissolved HFCS. To the solution, ginseng powder prepared by micro pulverization process was added under stirring and then purified water was added to balance the total amount. The obtained mixture was homogenized under pressure and then sterilized for 15 sec at 95° C. to prepare drink compositions A, B, C and D, respectively.

Figure 2:
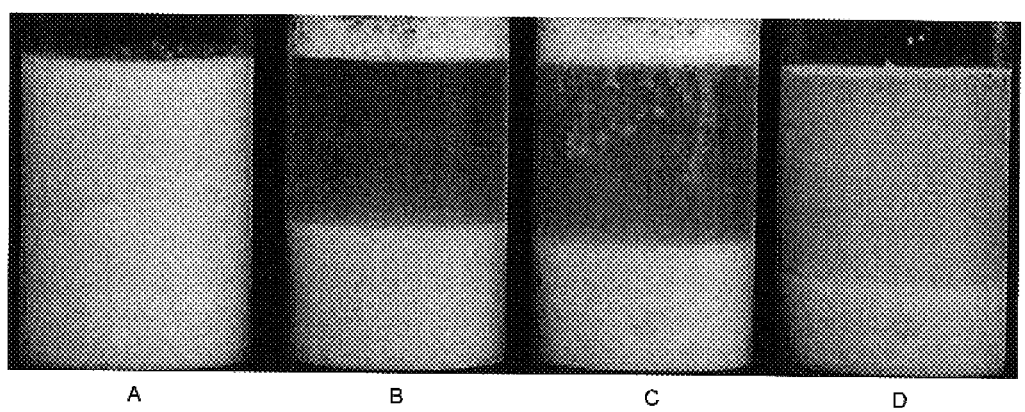
FIG. 2 shows the drink compositions A, B, C and D prepared in Example 1.

As can be seen in FIG. 2, the drink compositions B, C and D show a distinct layer separation, and thus they are inadequate as a drink composition. The drink composition A has a good stability against layer separation, but it is also inadequate as a drink composition since it is too thick.

EXAMPLE 2

TABLE 2

| Ingredients | A | B | C |
|---|---|---|---|
| Ginseng powder | 2.613 | 2.613 | 2.613 |
| HFCS | 7.8 | 7.8 | 7.8 |
| Vegetable cream | 1.0 | 1.0 | 1.0 |
| Honey | 1.046 | 1.046 | 1.046 |
| Homogen CJ-1 | — | — | 0.2 |
| Jujube extract | 0.4 | 0.4 | 0.4 |
| Chinese matrimony vine extract | 0.04 | 0.04 | 0.04 |
| Chinese quince extract | 0.01 | 0.01 | 0.01 |
| Xanthan gum | 0.05 | 0.05 | — |
| Sugar ester | 0.4 | 0.1 | 0.1 |
| Poly glycerol ester | — | 0.2 | — |
| Sodium alginate | 0.02 | — | — |
| Defoamer | 0.001 | 0.001 | 0.001 |
| Flavor | 0.01 | 0.01 | 0.01 |
| Preservative | 0.01 | 0.01 | 0.01 |
| purified water | proper quantity | proper quantity | proper quantity |
| Total | 100 | 100 | 100 |

According to the composition of Table 2, the raw materials including ginseng powder were completely dissolved in purified water to balance the composition to 100% by volume, homogenized under a pressure and then sterilized at about 138° C. for about 1 minute to give drink compositions A, B and C.

Figure 3:
FIG. 3 shows the drink compositions A, B and C prepared in Example 2.
Figure 4:
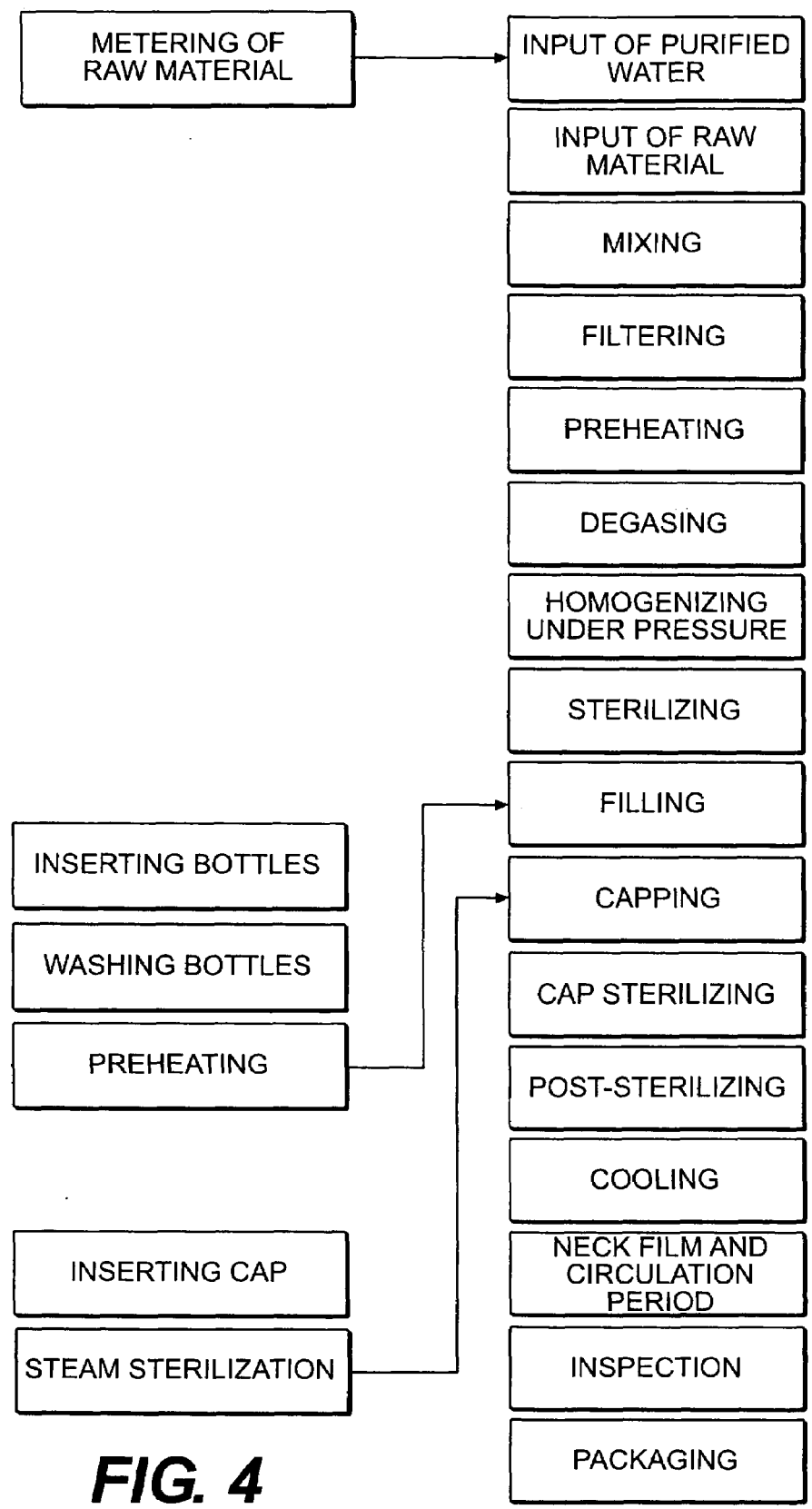
FIG. 4 shows a process flow diagram of a ginseng drink according to the present invention.

As can be seen in FIG. 3, the drink composition A shows a distinct formation of upper water layer, the drink composition B shows a layer separation at a third two position from the upper and the drink composition C does not give any layer separation to show a good emulsion & dispersion stability.

According to the present invention, it is possible to produce a drink containing ginseng or red ginseng powder on a commercial scale. Therefore, a new category of goods using ginseng or red ginseng has been developed, which is different from conventional drink using ginseng or red ginseng extract.

While a conventional drink using ginseng or red ginseng extract utilizes only specific components corresponding to 40~60% of ginseng or red ginseng, the drink using ginseng or red ginseng powder according to the present invention utilizes all parts of ginseng or red ginseng to enable to intake 100% of ginseng or red ginseng as well as to expect an increase of bioavailability due to the increase of unit surface area via ultrafine dividing process.

In addition, a conventional drink using ginseng or red ginseng extract has a peculiar bitter taste of ginseng or red ginseng extract, which restricts the consumer class of the drink. However, the drink using ginseng or red ginseng powder according to the present invention employs ginseng powder as well as diverse food materials such as honey, HFCS, vegetable cream, jujube extract and the like to have excellent sensory attribute so that everyone without distinction of age or sex can drink it without any feel to reject. Therefore, the present invention can contribute to enlargement of consumers of ginseng or red ginseng.

What is claimed is:

1. A drink composition comprising ultrafine powder of ginseng or red ginseng with a mean particle diameter of 0.1~74 μm, and a mixture stabilizer,
    wherein the drink composition is stable against layer separation, and
    said mixture stabilizer is composed of 1~20% (w/w) of carageenan, 0.5~20% (w/w) of CMC-Na, 5~60% (w/w) of microcrystalline cellulose, 0.5~10% (w/w) of xanthan gum, 2~30% (w/w) of sugar ester of fatty acids, 0.5~30% (w/w) of dextrin, 0.5~10% (w/w) of excipient, and 0.05~0.5% (w/w) of an edible oil.

2. The drink composition according to claim 1, wherein it comprises 0.05~5.0% (w/v) of powder of ginseng or red ginseng and 0.01~1.0% (w/v) of the mixture stabilizer, wherein it further comprises 0.05~5% (w/v) of honey, 0.05~5% (w/v) of herb medicine extract, 0.01~10.0% (w/v) of a sweetener, 0.05~5.0% (w/v) of a vegetable cream, 0.01~0.3% (w/v) of an emulsifier, 0.001~0.01% (w/v) of a defoamer, 0.01~0.5% (w/v) of a flavor, 0.01~0.06% (w/v) of a preservative and 69~99% (w/v) of purified water.

* * * * *